United States Patent [19]

Powell et al.

[11] E Re. 28,587

[45] Reissued Oct. 28, 1975

[54] TIRE AND WHEEL ASSEMBLIES

[75] Inventors: Leslie V. Powell, Lichfield; Reginald H. Edwards, Sutton Coldfield, both of England

[73] Assignee: Dunlop Holdings Limited, England

[22] Filed: Apr. 5, 1974

[21] Appl. No.: 458,134

Related U.S. Patent Documents

Reissue of:

[64] Patent No.: 3,739,829
Issued: June 19, 1973
Appl. No.: 154,326
Filed: June 18, 1971

[30] Foreign Application Priority Data

June 20, 1970 United Kingdom..... 30033/70
Apr. 3, 1971 United Kingdom..... 8592/71

[52] U.S. Cl. ..... 152/330

[51] Int. Cl.[2] ..... B60C 5/00

[58] Field of Search..... 152/330, 346, 347

[56] References Cited

UNITED STATES PATENTS

| | | | |
|---|---|---|---|
| 2,316,549 | 4/1943 | Benson | 152/330 |
| 3,628,585 | 12/1971 | Pace | 152/327 |

*Primary Examiner*—James B. Marbert
*Attorney, Agent, or Firm*—Stevens, Davis, Miller & Mosher

[57] ABSTRACT

A pneumatic tire and wheel assembly including a single chamber pneumatic tire in which is provided a flowable liquid lubricant to facilitate relative movement between the internal surface of the tire which come into contact when the tire is run under load in the deflated condition, of which the following is a specification.

37 Claims, 1 Drawing Figure

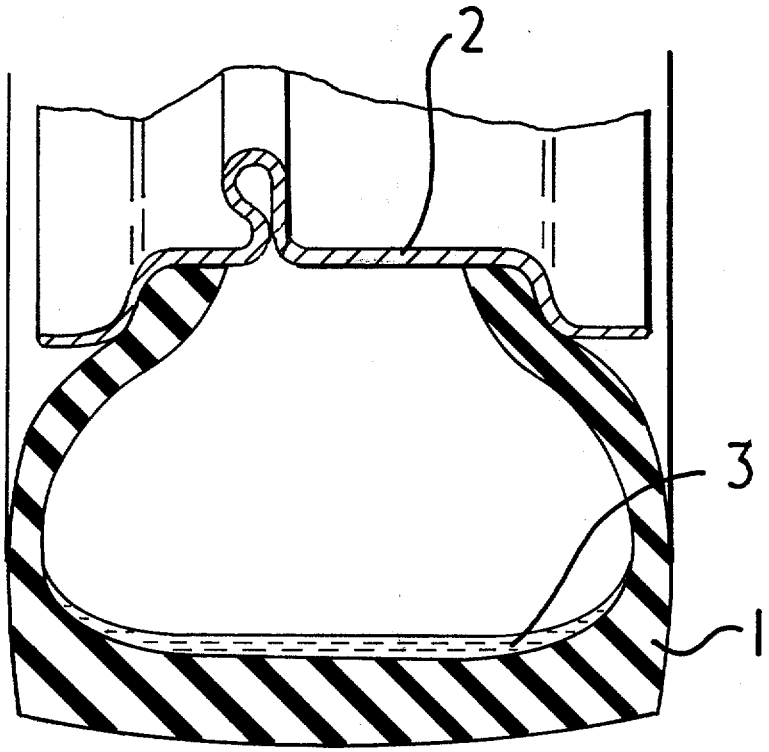
2
3
1

TIRE AND WHEEL ASSEMBLIES

Matter enclosed in heavy brackets [ ] appears in the original patent but forms no part of this reissue specification; matter printed in italics indicates the additions made by reissue.

---

This invention relates to tire/wheel assemblies.

Upon partial or complete deflation of a pneumatic tire mounted on a wheel during the running of a vehicle opposite surfaces in the interior of the tire and wheel assembly come into contact with one another under more or less load according to whether or not deflation is complete, considerable heat is generated within the rubber and textile components of the tire and very rapid structural failure ensues.

One approach to this problem in the past has been to provide a second, independent, air chamber inside the tire so that if the tire is punctured the second chamber remains inflated and prevent the tire from collapsing and "running on the rim." The disadvantages of this type of construction are that it is expensive and adds weight to the tire and hence adds to the unsprung weight of a vehicle on which it is used. A grave problem is also that the inner chamber chafes on the interior of the outer chamber of the tire even, in the bead region at least, during normal running of the tire. To combat this problem it has been proposed to lubricate the surface of the inner chamber and/or inner surface of the outer chamber with a suitable coating. Low profile tires e.g. of aspect ratio 30 percent to 75 percent present a further problem in that the low sectional height allows little height for an inner chamber to prevent the tire bottoming on the rim.

The regions of the interior surfaces of a single chamber pneumatic tire which normally come into contact when running in the deflated condition are the interior surfaces of the tire close to but radially outwardly of the rim flange and the interior surfaces of the tire close to but radially-inwardly of the tread edge. It has been discovered that the major source of the heat generated which leads to the failure of the tire, is the relative movement of the interior surfaces of the tire which are in contact and under load.

According to the present invention a pneumatic tire and wheel assembly comprises a single chamber pneumatic tire wherein a flowable liquid lubricant is provided for the lubrication of the interior surfaces of the tire whereby in use of said assembly with the tire in a deflated or substantially under-inflated condition the relative movement between the interior surfaces of the tire in contact with one another is facilitated.

The liquid lubricant preferably is miscible with water so that leakage from a tire and wheel assembly onto a road surface can be washed away although a water insoluble lubricant can be used if desired. It is also desirable that the lubricant should not freeze at temperatures above −20° C so as to withstand cold weather. The liquid lubricant may have a boiling point of at least 90° C and preferably, in order to withstand high temperatures without severe loss through volatilization a liquid component of the lubricant has a vapor pressure of less than 50 mm of mercury at 140° C.

The liquid lubricant advantageously has a viscosity which is as high as is practicable to minimize lubricant loss through a puncture and assist in sealing a puncture bearing in mind the need for the lubricant to flow into the portions of the tire interior requiring lubrication. The preferred viscosity range for the liquid lubricant is 10,000 to 200,000 centistokes at 38° C. Preferably also the lubricant although having a high viscosity has a low resistance to shear i.e. is a thixotropic material.

The liquid lubricant preferably has no deleterious effect on the rubber or other component of the tire carcass. If desired liquid lubricants which normally swell or otherwise affect rubber could be used by the use of a special impervious protective inner liner in the tire.

The liquid lubricant may, with advantage, contain a volatile liquid, which may or may not itself act as a lubricant for the rubber but which has a boiling point sufficiently low to appreciably volatilize at the temperature generated by running of the tire in a deflated or partly deflated condition. In this way the volatile liquid functions to partially re-inflate the tire and so reduce the high stresses generated in the sidewall due to the deflated or substantially deflated condition. Heat build-up in the tire is also lowered due to the reduced contact pressure and hence reduced frictional forces between the interior tire surfaces. The volatilizing of the volatile liquid also assists the dissipation of heat over the entire tire and rim surface. The volatile liquid has a vapor pressure at 80° C above 200 mm. of mercury and may have a boiling point below for example 100° C but preferably not below, for example 70° C in order that the liquid may be readily handled and not volatilized appreciably during normal running of the tire.

The volatile liquid, may itself be used to form the basis of the lubricant, e.g. an aqueous gel, although it is then particularly preferable to include in the lubricant some puncture sealing material in order to at least partly seal a puncture occurring in the tire to minimize the rate at which lubricant is lost from the tire.

Preferably the liquid lubricant containing a volatile liquid comprises a high boiling point lubricant, e.g. glycerol, and a volatile liquid which need not necessarily have good lubricating properties, e.g. water, so that if all the volatile liquid is lost as vapor from the tire the high boiling point lubricant remains. The liquids may or may not be miscible with each other.

In the case of liquid lubricants containing water as the volatile liquid viscosities in the range 10,000 to 200,000 centistokes, and good lubricant properties can be achieved by the use of gelling agents such as those available under the trade names Natrosol, Polysteric EN4 and Carbopol. Viscous liquid lubricants such as gelled water-based lubricants have the added advantage that they assist in sealing a puncture at least against the low, e.g. 4 p.s.i. pressures produced by vapor pressure inflation.

When the lubricant contains a volatile component it is most desirable that the lubricant should be capable of sealing the puncture. Thus the liquid lubricant may have incorporated therein a separate puncture-sealing or reducing material, for example, chopped cotton, wool, asbestos or synthetic fibers, e.g. of 0.0001 inch diameter and about 0.1 inch long which acts to form a matted barrier over a puncture and is carried into position by escaping inflationary air and/or lubricant.

A liquid lubricant based on an aqueous gel may contain, for example, a freeze point lowering agent such as ethylene glycol or glycerol and agents to increase the lubricating power such as molybdenum disulphide, isoersable graphite powder and/or wetting agent or etergent such as Teepol.

It may be advantageous for the liquid lubricant to ave a formulation which enables the lubricant to be othed or foamed by the violent agitation caused by otation of the tire/ wheel assembly. The foamed lubriant is spacially dispersed throughout the interior of ie tire ensuring that lubrication in all regions of the re is maintained. Such foaming may be obtained by ample in the tire mentioned above using water as a volatile component at least 5 [ millimeters ] *milliliters* of water should be used, although a considerably larger volume would generally be used to ensure a rapid increase in pressure in the tire and allow for possible losses.

The liquid lubricant may be taken from a wide range of classes of compounds which are lubricants for rubber to rubber interfaces, for example:

| | |
|---|---|
| Animal oils | |
| Vegetable oils | e.g. arachis, castor, linseed, olive, palm, rape, turkey red. |
| Alcohols | e.g. n-octanol. |
| Esters | e.g. diethyl sulphate, methyl caprylate. |
| Silanes | |
| Non-ionic surface active agents | |
| Cationic surface active agents | |
| Anionic surface active agents | |
| Polyglycols | (sometimes called glycols, polyethers, polyalkylene glycols or polyoxyalkylene glycols), e.g. "Ucon 50 HB-2000" and 50-HB-170. |
| Dibasic acid esters e.g. dimethyl oxalate | |
| Chlorofluorocarbon polymers | |
| Silicones | |
| Silicate esters | |
| Fluoroesters | |
| Neopentyl polyol esters | |
| Polyphenyl ethers | |
| Tetra alkyl silanes | |
| Ferrocene derivatives | |
| Tetra-substituted urea derivatives | |
| Heterocyclic derivatives | |
| Aromatic amines | |
| Hexafluorobenzene | |
| Soaps | (e.g. sodium stearate) |
| Alkalis | (e.g. sodium hydroxide in weak solutions). |

ie of a detergent in a lubricant containing water. A deaming agent may also be used in the lubricant composition to control the extent of foaming, or if desired, event foaming.

A dispersant may be used when fibers are incorpoted in the composition.

The total amount of liquid lubricant in the tire is a inor proportion of the total volume of the tire, being opreciably less, for example, [ that ] *than* the large olume of water used as ballast in agricultural and simir type tires which [as] *is* a major proportion e.g. ⅔, the interior volume of the tires. Such large volumes the present invention would be quite impractical nce they impair the running properties of the tire, cre-e high rolling resistance and prevent the tire from eing used at anything other than low speeds. In the resent invention, the amount of liquid lubricant deends upon the lubricant used and the internal surface rea of the inflation chamber of the tire but for examle in a 185/60–13 radial ply car tire of internal volume pproximately 28 liters the total amount of lubrication ill generally be at least 75 [ millimeters ] *milliliters* ut preferably less than e.g. 1 liter since above this volme the liquid is becoming undesirably heavy and ulky. This corresponds to between 105 and 1,300 [millimeters ] *milliliters* of lubricant per square meter f internal surface area of the tire.

In the case of a lubricant containing a volatile comonent sufficient volatile component should preferably e present to generate in a volume at least 4 times that f the inflation chamber of the tire a pressure of at least p.s.i. at a temperature of for example, 68°C. For Ex- Some examples of specific compounds which may be used are sodium carboxymethyl cellulose, hydroxyethyl cellulose, hydroxypropyl cellulose, silicone oil, glycerol, propylene glycol, "Teepol" (a detergent commercially available from Shell), "Hederol" (a detergent commercially available from Proctor and Gamble), or mixtures thereof.

Examples of liquid lubricants containing a volatile component are solutions of detergents e.g. "Teepol" in water, aqueous gels containing e.g. hydroxyethyl cellulose with or without a high boiling point such as glycerol, and mixtures of polyglycols or glycerol with water.

In addition to the puncture sealing and other additives previously mentioned the liquid lubricant may contain other substances such as antioxidants, to prevent oxidative attack on the lubricant, bactericide, wetting agent and viscosity index improver [ro] *to* broaden the range of temperatures at which the lubricant has a satisfactory viscosity.

In order to minimize the weight of lubricant required and any detrimental effects on the balance of the wheel/tire assembly the liquid lubricant preferably has a relatively low specific gravity e.g. a specific gravity less than 1.4.

In order to maintain a degree of lateral stability even when deflated, the tire preferably has a fairly low aspect ratio e.g. 30 percent to 75 percent and preferably 55 percent to 70 percent and the width of the tire tread is preferably greater than the width of the wheel rim measured between the flanges. If desired a tire having a cantilever sidewall construction may be used e.g. that described in [U.K. Patent application No.

26702/70.] *U.S. Patent Application No. 145,610 filed May 21, 1971.* The wheel rim upon which the tire is mounted is preferably a flat or substantially flat base rim without a well into which the tire beads can fall if they are displaced from their seats.

Two suitable types of rim which can be used are split rims, where the rim is divisible to permit mounting of a tire thereon and axially compressed rims which are rims produced initially with a well, the well being closed by axial compression after the tire has been mounted thereon, the latter type is shown in the accompanying drawing. When the rim has no well, if the beads become displaced from their seats in the ground contact area of the tire it is possible for them to be returned to their correct positions by the forces generated during rotation of the wheel in normal straight ahead driving although means for positively retaining at least the laterally outer bead in its seat may be provided if desired. If a well-base rim is used, means are provided for retaining the beads in their seats, e.g. a bead spacer ring or removable studs or projections on the wheel rim.

Two particular examples of carrying out the invention will now be described with reference to the accompanying drawing of a cross section of a tire 1 mounted on a wheel rim 2 and containing liquid lubricant 3.

Two gelled solutions of a water-based liquid lubricant were made up as indicated in Table I below:

TABLE I

| | Solution 1 (thin) | Solution 2 (thick) |
|---|---|---|
| Teepol S (containing sodium salts of alkylaryl sulphonates and secondary alkyl sulphonates) | 5 ml. | 5 ml. |
| Water | 95 ml. | 95 ml. |
| 2% Belloid T.D. disperant (sodium dinaphthylmethane disulphonate 80% active - made by Geigy) | 5 ml. | 5 ml. |
| Asbestos (Canadian Group 7 0-0-0-16 (Floats) very short low grit 7 T.F.I. supplied by Johns-Manville) | 2 g. | 2 g. |
| Defoamer C.V.P. (made by Cray Valley Products) | 1 ml. | 1 ml. |
| Natrosol 260 H.H.R. thickener (water-soluble hydroxyethyl cellulose supplied by Hercules Powder Co. Ltd.) | 1 g. | 1.5 g. |
| Viscosity | 10,000 centistokes | 100,000 centistokes |

500 [millimeters] *milliliters* of this lubricant was introduced into the inflation chamber of a pneumatic tire (size 185/60 × 13) mounted on a 3.50–13 wheel rim (see drawing).

When a tire lubricated by means of the liquid as described above is deflated or substantially deflated, opposite parts of the interior surfaces of the tire or tire and wheel assembly come into contact and that part of the load of the vehicle which is supported by the tire and wheel assembly is carried by those surfaces, substantial relative movement taking place between them.

However, since the contacting surfaces are lubricated, the coefficient of friction is very low and little heat is generated, insufficient to cause structural damage or changes to the tire which might cause a rapid noticeable deterioration in the control of the vehicle. The vehicle on which the wheel and tire were mounted was thus enabled safely to travel substantial distances e.g. 30 or more miles at a reasonable speed, e.g. 40 m.p.h., a replacement tire and wheel assembly eventually being fitted.

An example of a liquid lubricant comprising glycerol as a high boiling lubrication and water as a volatile component is given below in Table II.

TABLE II

| | |
|---|---|
| Water | 70 ml. |
| Glycerol | 30 ml. |
| Natrosol 1250 HHR. | 2 gm. |
| Hederol (detergent made by Proctor & Gamble) | 1 ml. |

A 185/60–13 radial ply tire containing 300 millimeters of this lubricant was run under 400 lbs load against a rotating drum at 50 m.p.h. and the drag generated by the tire i.e. its resistance to rotation was measured. The initial drag was 35.6 lbs but this value reduced steadily over the 10 minute run to a final figure of 20.1 lbs. After the 10 minutes the tire was found to be inflated to 3.5 psi.

Various further tests were performed using similar tires on the same test rig. In these tests however, the tires were run at 30 m.p.h. and the temperature generated in the shoulder of the tire were measured after 10 minutes and 20 minutes. To obtain a strict comparison between lubricating properties in these further tests care was taken to ensure that the tire did not become inflated.

Firstly, a series of tests was performed to investigate the effect of varying the amount of lubricant. Table III below gives the results obtained using as lubricant a polyalkylene glycol (available commercially as UCON oil) having a viscosity of 433 centistokes.

Table IV below gives the results obtained using as lubricant a 50/50 mixture of the polyalkylene glycol used in the tests in Table I and water.

Table V below gives the results obtained using as lubricant the glycerol/aqueous gel lubricant whose [formation] *formulation* is given above.

TABLE III

| Volume of lubricant | Type/Viscosity Centistokes at 38°C | Temperatures (°C) after 10 mins. | 20 mins. | Ambient |
|---|---|---|---|---|
| 300 c.c. | UCON/433 | 120 | 135 | 21 |
| 200 c.c | UCON/433 | 117 | 135 | 19 |
| 125 c.c. | UCON/433 | 120 | 140 | 19 |
| 50 c.c. | UCON/433 | 120 | 140 | 19 |

TABLE IV

| | | | | |
|---|---|---|---|---|
| 300 c.c | UCON 433/Water (50/50) | 100 | 120 | 20 |
| 200 c.c. | " | 105 | 130 | 22 |
| 125 c.c. | " | 115 | 140 | 25 |
| 50 c.c. | " | 120 | 140 | 26 |

TABLE V

| Volume of lubricant | Type/Viscosity Centistokes at 38°C Water/Glycerol/Nitrosol/Hederol>100,000 | Temperatures (°C) after 10 mins. | 20 mins. | Ambient |
|---|---|---|---|---|
| 300 c.c. | (70/30) | 90 | 110 | 18 |
| 200 c.c. | " | 108 | 122 | 20 |
| 125 c.c. | " | 115 | 125 | 22 |
| 50 c.c. | " | 125 | 135 | 22 |

It will be seen that in each case the temperature after 20 minutes is considerably higher than that after 10 minutes and that the temperature rises furthest when the smallest amount of lubricant is used.

Secondly a series of tests was performed to compare the lubricant properties of various liquid lubricants, water being included for comparison. Similar tires run at the same speed and load as in the first series of tests but each tire contained 200 millimeters of a different lubricant. The results of this series of tests are given below in Table VI.

TABLE VI

| Type | Viscosity Centi-Stokes at 38°C | Temperature (°C) after 10 mins. | 20 mins. | Ambient |
|---|---|---|---|---|
| Glycerol | 224 | 118 | 123 | 25 |
| Propylene Glycol | 46 | 105 | 115 | 26 |
| Silicone oil | 470 | 105 | 125 | 23/24 |
| Silicone oil | 20 | 117 | 130 | 22 |
| Water | 0.7 | 100 | 150 | 20 |
| UCON oil (polyalkylene glycol) | 433 | 117 | 135 | 19 |

It will be seen that water initially maintains a low temperature which after 10 minutes is as low as or lower than the other lubricants but after a certain level of temperature in the tire is reached the temperature begins to rise very rapidly so that after 20 minutes the temperatures of the water-containing tire has risen to 150° C which is approaching tire failure.

If lubricant should leak onto the road surface, when it is water-based or miscible with water it can be washed away by rainfall, so as to prevent the build-up of a hazard to other road vehicles by the reduction of the coefficient of the road surface below a safe level.

When a liquid lubricant containing a volatile component is used it may be desirable to include in the wheel rim or tire a safety pressure release valve or other device e.g. a safety plug to prevent the tire from becoming over-inflated. However, as the increasing internal pressure increases the boiling point of the liquid lubricant, it is advantageous to design the lubricant so that its boiling point, at the maximum permissible tire inflation pressure has increased to above the maximum permissible generated temperature, so that boiling of the lubricant stops before the tire can become severely over-inflated.

In the present invention the liquid lubricant may be inserted directly into the inflation chamber of the tire before the tire and wheel assembly is sold, preferably, however, the lubricant is provided in an enclosing means which releases the lubricant into the tire upon deflation as described in [U.K.] *U.S.* Patent application No. [30027/70] *150,627 filed June 7, 1971* (interior lubricant container). Alternatively the lubricant may be injected into the tire after deflation as described in [U.K.] *U.S.* Patent application No. [30028/70] *150,562 filed June 7, 1971*. The invention may also be used with the inventions described in [U.K.] *U.S.* Patent application Nos. [30029/70, 30030/70, 30031/70, 30032/70 and 07024/71] *150,628, 150,561, 150,564, 150,560 all filed on June 7, 1971 and 232,850 filed on March 8, 1972.*

The invention applies to tire and wheel assemblies in which the tire can be removed from the rim or, alternatively, when the tire is not removable therefrom i.e. the two form a permanent assembly, for example, when the rim is swaged over the tire beads after assembly of tire and rim.

We claim:

1. A pneumatic tire and wheel assembly having a single inflation chamber capable of being run in a deflated condition comprising:

1. a wheel having a wheel rim with a pair of opposed annular flanges;
2. a pneumatic tire having a tread portion whose width is greater than the width of the wheel rim measured between the flanges [;] *and in which the wheel rim upon which the tire is mounted is substantially flat based without a well into which the tire beads can fall if they are displaced from their seats, the rim being divisible to permit mounting of the tire thereon;*
3. a flowable liquid lubricant which, when the assembly is used with the tire in a deflated condition, will facilitate relative movement of contacting interior surfaces of the tire.

2. The pneumatic tire and wheel assembly of claim 1, in which the liquid lubricant is miscible with water.

3. The pneumatic tire and wheel assembly of claim 1, in which the liquid lubricant does not freeze at temperatures above −20° C.

4. The pneumatic tire and wheel assembly of claim 1, in which at least one liquid component of the lubricant has a vapor pressure of less than 50 mm of mercury at 140° C.

5. The pneumatic tire and wheel assembly of claim 1, in which the liquid lubricant includes some puncture sealing material in order to at least partially seal a puncture occuring in the tire.

6. The pneumatic tire and wheel assembly of claim 1, in which the liquid lubricant has a specific gravity less than 1.4

7. The pneumatic tire and wheel assembly of claim 1, in which the tire has an aspect ratio between 30 percent and 75 percent.

8. The pneumatic tire and wheel assembly of claim 7, in which the aspect ratio of the tire is in the range 55 percent to 70 percent.

[9. The pneumatic tire and wheel assembly of claim 1, in which the wheel rim upon which the tire is mounted is substantially flat based without a well into which the tire beads can fall if they are displaced from their seats, the rim being divisible to permit mounting of the tire thereon.]

[10. The pneumatic tire and wheel assembly of claim 1, in which the wheel rim upon which the tire is mounted is produced initially with a well to permit mounting of the tire on the rim, the well being closed by axial compression after the tire has been mounted thereon.]

11. The pneumatic tire and wheel assembly of claim 1, in which the liquid lubricant contains a volatile liquid which has a boiling point sufficiently low to appreciably volatilize at the temperature generated by running of the tire in a deflated or partly deflated condition.

12. The pneumatic tire and wheel assembly of claim 1, in which the total amount of lubricant in the tire is in the range of 105 to 1,300 mls of lubricant per square meter of internal surface area of the tire.

13. The pneumatic tire and wheel assembly of claim 1, in which the liquid lubricant has a formulation which enables the lubricant to be frothed or foamed by the violent agitation caused by rotation of the tire and wheel assembly.

14. The pneumatic tire and wheel assembly of claim [1] *13* including a [deforming] *defoaming* agent to control the extent of foaming.

[15. The pneumatic tire and wheel assembly of claim 1, in which the rim has an area of excess material bent so as to leave the rim substantially without a well between the flanges.]

*16. A pneumatic tire and wheel assembly having a single inflation chamber capable of being run in a deflated condition comprising:*

*a. A wheel having a wheel rim with a pair of opposed annular flanges;*

*b. A pneumatic tire having a tread portion whose width is greater than the width of the wheel rim measured between the flanges, and in which the wheel rim upon which the tire is mounted is produced initially with a well to permit mounting of the tire on the rim, the well being closed by axial compression after the tire has been mounted thereon;*

*c. A flowable liquid lubricant which, when the assembly is used with the tire in a deflated condition, will facilitate relative movement of contacting interior surfaces of the tire.*

*17. A pneumatic tire and wheel assembly having a single inflation chamber capable of being run in a deflated condition comprising:*

*a. A wheel having a wheel rim with a pair of opposed annular flanges;*

*b. A pneumatic tire having a tread portion whose width is greater than the width of the wheel rim measured between the flanges;*

*c. A flowable liquid lubricant which, when the assembly is used with the tire in a deflated condition, will facilitate relative movement of contacting interior surfaces of the tire, and in which the liquid lubricant contains a volatile liquid which has a boiling point sufficiently low to appreciably volatilize at the temperature generated by running of the tire in a deflated or partly deflated condition.*

*18. The pneumatic tire and wheel assembly of claim 17, in which the liquid lubricant is miscible with water.*

*19. The pneumatic tire and wheel assembly of claim 17, in which the liquid lubricant does not freeze at temperatures above −20° C.*

*20. The pneumatic tire and wheel assembly of claim 17, in which at least one liquid component of the lubricant has a vapor pressure of less than 50 mm of mercury at 140° C.*

*21. The pneumatic tire and wheel assembly of claim 17, in which the liquid lubricant includes some puncture sealing material in order to at least partially seal a puncture occurring in the tire.*

*22. The pneumatic tire and wheel assembly of claim 17, in which the liquid lubricant has a specific gravity less than 1.4.*

*23. The pneumatic tire and wheel assembly of claim 17, in which the tire has an aspect ratio between 30% and 75%.*

*24. The pneumatic tire and wheel assembly of claim 23, in which the aspect ratio of the tire is in the range of 55% to 70%.*

*25. A pneumatic tire and wheel assembly having a single inflation chamber capable of being run in a deflated condition comprising:*

*a. A wheel having a wheel rim with a pair of opposed annular flanges, and in which the rim has an area of excess material bent so as to leave the rim substantially without a well between the flanges;*

*b. A pneumatic tire having a tread portion whose width is greater than the width of wheel rim measured between the flanges;*

*c. A flowable liquid lubricant which, when the assembly is used with the tire in a deflated condition, will facilitate relative movement of contacting interior surfaces of the tire.*

*26. A pneumatic tire and wheel assembly capable of being run in a deflated condition and having a single inflation chamber comprising:*

*a. A wheel having a wheel rim with a pair of opposed annular flanges and a substantially flat base rim between said flanges so that the wheel rim is without a well into which the tire beads can fall, and a bead retaining means for restraining at least the laterally outer bead from moving from its seat;*

*b. A pneumatic tire having an aspect ratio of between 30% and 75%, a tread portion whose width is greater than the width of the wheel rim measured between the flanges and flowable lubricating material disposed on an interior surface of the tire which, when the assembly is used with the tire in a deflated condition, will facilitate relative movement of contacting interior surfaces of the tire.*

*27. A pneumatic tire and wheel assembly capable of being run in a deflated condition and having a single inflation chamber comprising:*

*a. A wheel having a wheel rim with a pair of opposed annular flanges, a pair of bead seats adjacent said flanges and a well to permit a tire to be mounted on the rim, means being provided for physically restraining the beads in their seats to prevent the tire beads from falling into the well, said means being*

*movable to permit the tire to be dismounted from the rim;*

*b. A pneumatic tire having a tread portion whose width is greater than the width of the wheel rim measured between the flanges and a flowable lubricating material disposed on an interior surface of the tire, the entire interior of said tire being free of intermediate supporting structure and the entire interior surface of said tire being free of intermediate protruding supporting structure so that when the tire is in a deflated condition opposed portions of the interior surface of the tire are movable relative to each other without generating an undue amount of heat by means of the lubricating material, which, when the assembly is used with the tire in a deflated condition, will facilitate relative movement of contacting interior surfaces of the tire.*

*28. A pneumatic tire and wheel assembly capable of being run in a deflated condition and having a single inflation chamber comprising:*

*a. A wheel having a wheel rim with a pair of opposed annular flanges and a substantially flat base rim between said flanges so that the wheel rim is without a well into which the tire beads can fall;*

*b. A pneumatic tire having a tread portion whose width is greater than the width of the wheel rim measured between the flanges, an aspect ratio between 30% and 75% and a flowable liquid lubricating material disposed inside the tire which, when the assembly is used with the tire in a deflated condition, will facilitate relative movement of contacting interior surfaces of the tire.*

*29. The pneumatic tire and wheel assembly of claim 28, in which the lubricating material is miscible with water.*

*30. The pneumatic tire and wheel assembly of claim 28, in which the lubricating material does not freeze at temperatures above* −20° C.

*31. The pneumatic tire and wheel assembly of claim 28, in which at least one liquid component of the lubricating material has a vapor pressure of less than 50 mm of mercury at 140°C.*

*32. The pneumatic tire and wheel assembly of claim 28, in which the lubricating material includes some puncture sealing material in order to at least partially seal a puncture occurring in the tire.*

*33. The pneumatic tire and wheel assembly of claim 28, in which the lubricating material has a specific gravity less than 1.4.*

*34. The pneumatic tire and wheel assembly of claim 28, in which the aspect ratio of the tire is in the range of 55% to 70%.*

*35. The pneumatic tire and wheel assembly of claim 28, in which the total amount of lubricating material in the tire is in the range of 105 to 1,300 mls. of lubricant per square meter of internal surface area of the tire.*

*36. The pneumatic tire and wheel assembly of claim 28, in which the lubricating material has a formulation which enables the lubricant to be frothed or foamed by the violent agitation caused by rotation of the tire and wheel assembly.*

*37. The pneumatic tire and wheel assembly of claim 28, including a defoaming agent to control the extent of foaming.*

*38. A pneumatic tire and wheel assembly having a single inflation chamber capable of being run in a deflated condition comprising:*

*a. A wheel having a wheel rim with a pair of opposed annular flanges, a pneumatic tire mounted on the rim and having a pair of beads between the flanges and means on the rim to prevent the beads from becoming dislodged from the rim when run in a deflated condition;*

*b. a flowable liquid lubricant which, when the assembly is used in a deflated condition, will facilitate relative movement of contacting interior surfaces of the tire, said liquid lubricant containing a volatile liquid which has a boiling point sufficiently low to appreciably volatilize at the temperature generated by running of the tire in a deflated or partly deflated condition and a puncture sealing material to at least partially seal a puncture occurring in the tire.*

*39. A pneumatic tire and wheel assembly capable of being run in a deflated condition and having a single inflation chamber comprising:*

*a. A wheel having a wheel rim with a pair of opposed annular flange and a substantially flat base rim between said flanges so that the wheel rim is without a well into which the tire beads can fall, and a bead retaining means for restraining at least the laterally outer bead from moving from its seat;*

*b. A pneumatic tire having an aspect ratio of between 30% and 75%, a tread portion whose width is greater than the width of the wheel rim measured between the flanges and flowable lubricating material disposed on an interior surface of the tire, the entire interior of said tire being free of intermediate supporting structure and the entire interior surface of said tire being free of intermediate protruding supporting structure so that when the tire is in a deflated condition opposed portions of the interior surface of the tire are movable relative to each other without generating an undue amount of heat by means of the lubricating material, which, when the assembly is used with the tire in a deflated condition, will facilitate relative movement of contacting interior surfaces of the tire.*

*40. A pneumatic tire and wheel assembly capable of being run in a deflated condition and having a single inflation chamber comprising:*

*a. A wheel having a wheel rim with a pair of opposed annular flanges and a substantially flat base rim between said flanges so that the wheel rim is without a well into which the tire beads can fall;*

*b. A pneumatic tire having a tread portion whose width is greater than the width of the wheel rim measured between the flanges, an aspect ratio between 30% and 75% and a flowable liquid lubricating material disposed inside the tire, the entire interior of said tire being free of intermediate supporting structure and the entire interior surface of said tire being free of intermediate protruding supporting structure so that when the tire is in a deflated condition opposed portions of the interior surface of the tire are movable relative to each other without generating an undue amount of heat by means of the lubricating material, which, when the assembly is used with the tire in a deflated condition, will facilitate relative movement of contacting interior surface of the tire.*

* * * * *